Patented Dec. 10, 1935 2,024,027

UNITED STATES PATENT OFFICE 2,024,027

FUMIGANT

Richard T. Cotton and Harry D. Young, Washington, D. C.; dedicated to Government and the People of United States of America No Drawing. Application April 10, 1931,
Serial No. 529,280

4 Claims. (Cl. 167—22)

(Granted under the act of March 3, 1883, as amended April 30, 1928; 370 O. G. 757)

This application is made under the Act of March 3, 1883, as amended by the Act of April 30, 1928, and the invention herein described, if patented, may be manufactured and used by or for the Government for governmental purposes without the payment to us of any royalty thereon.

We hereby dedicate the invention herein described to the free use of the public to take effect upon the granting of a patent to us.

Our invention relates to improvements in materials and methods for destroying or checking the growth or multiplication of insect life which is economically injurious to man.

An object of this invention is to provide a material that will increase the toxicity of the fumigant to which it is added.

Another object of the invention is to provide a material that when added to a fumigant will reduce the time of exposure necessary to kill economically injurious insects.

Another object of the invention is to provide a material which by increasing the rate of metabolism of insects renders them more susceptible to the action of fumigants to which it is added.

Another object of the invention is to provide a material which when added to fumigants will render possible the successful fumigation of highly absorbent materials such as nutmeats, bulbs, cereals, etc., by short exposures.

Still another object of the invention is to provide a material which when added to other fumigants will produce an effective mixture which is relatively non-toxic to man and which can be used in place of hydrocyanic acid gas or carbon disulfide for destroying insects.

Still another object of the invention is to provide a material which when added to a fumigant will not injuriously affect the germination seeds or bulbs, or have any deleterious effect upon foodstuffs or other material fumigated with it.

We have found that when the carbon dioxide content of the air is increased to certain concentrations the rate of metabolism of insects exposed to these concentrations is greatly increased, thus rendering the insects more susceptible to the action of various fumigants that may be added to these mixtures of carbon dioxide and air. This susceptibility increases up to a certain point, varying with the fumigant with which it is used, with the increase in percentage of carbon dioxide in the air. This increase in susceptibility is well illustrated in the following tables which contain data that indicate the increase in toxicity to *Tribolium confusum* (a common flour-infesting insect) of two fumigants when increasing quantities of carbon dioxide are added to the fumigation chamber.

TABLE I

Lethal effect upon adults of Tribolium confusum of ethylene dichloride alone and in combination with carbon dioxide in 6-liter flasks.

| Length of exposure in hours | Percent kill with ethylene dichloride 63 mg. per liter | | | | | |
|---|---|---|---|---|---|---|
| | Alone | With carbon dioxide, per liter | | | | |
| | | 42 mg. | 83 mg. | 165 mg. | 330 mg. | 660 mg. |
| 1 | 0 | 5 | 80 | 10 | 50 | 50 |
| 2 | 0 | 75 | 90 | 80 | 95 | 100 |
| 3 | 40 | 65 | 100 | 95 | 100 | 100 |
| 4 | 20 | 85 | 100 | 100 | 100 | 100 |
| 5 | 50 | 80 | 100 | 100 | 100 | 100 |

TABLE II

Lethal effect upon adults of Tribolium confusum of ethylene dichloride alone and in combination with carbon dioxide in 6-liter flasks.

| Length of exposure in hours | Percent kill with ethylene dichloride 84 mg. per liter | | | | |
|---|---|---|---|---|---|
| | Alone | With carbon dioxide, per liter | | | |
| | | 42 mg. | 83 mg. | 165 mg. | 330 mg. |
| 1 | 25 | 80 | 35 | 85 | 100 |
| 2 | 35 | 50 | 95 | 100 | 100 |
| 3 | 50 | 100 | 100 | 100 | 100 |
| 4 | 100 | 100 | 100 | 100 | 100 |
| 5 | 100 | 100 | 100 | 100 | 100 |

TABLE III

Lethal effect upon adults of Tribolium confusum of methyl chloroacetate alone and in combination with carbon dioxide in 6-liter flasks.

| Length of exposure in hours | Percent kill with methyl chloroacetate 4 mg. per liter | | | | |
|---|---|---|---|---|---|
| | Alone | With carbon dioxide, per liter | | | |
| | | 42 mg. | 83 mg. | 165 mg. | 330 mg. |
| 1 | 5 | 15 | 15 | 65 | 100 |
| 2 | 10 | 60 | 40 | 65 | 100 |
| 3 | 60 | 90 | 75 | 100 | 100 |
| 4 | 70 | 100 | 100 | 100 | 100 |
| 5 | 100 | 100 | 100 | 100 | 100 |

The data in the tables indicate that the addition of carbon dioxide reduces the necessary length of exposure and also the amount of fumigant necessary to kill. This action is further demonstrated in an experiment in which ethylene oxide was used as a fumigant in combination with carbon dioxide. When used alone at the rate of 3 pounds to 1000 cu. ft. of enclosed space ethylene oxide gave a 100% kill of Tribolium confusum adults in 3 hours; when used in combination with carbon dioxide at the rate of about 14 pounds to 1000 cu. ft., the same dose of ethylene oxide gave a 100% kill in 45 minutes, or in one-fourth of the time. To obtain a perfect kill in 45 minutes without the addition of carbon dioxide it required slightly more than 6 pounds of the fumigant, or more than twice the dose, to 1000 cu. ft. of space.

In the fumigation of materials that are highly absorptive the addition of carbon dioxide to the fumigant makes possible a short fumigation with a small amount of the fumigant, for example in the fumigation by vacuum of raw peanuts it was found impossible to obtain a 100% kill of Tribolium confusum adults, buried in bags of the peanuts, in two hours when chloropicrin was used alone even at the excessive rate of 48 ounces per 100 cu. ft. of space. When used with carbon dioxide at the rate of 2.8 pounds per 100 cu. ft. of space 7 ounces of chloropicrin gave a 100% kill of the insects in 2 hours. When used with carbon dioxide at the rate of 4.2 pounds per 100 cu. ft. of space only 4 ounces of chloropicrin per 100 cu. ft. was needed to give a 100% kill of the insects buried in the raw peanuts.

The carbon dioxide can be added in the solid or gaseous form or can be mixed prior to application with other fumigants. The mixtures can be used in vacuum tanks, fumigation chambers, grain bins, houses or any enclosed space against any insect pest.

For example in the fumigation of raw peanuts in a vacuum tank, chloropicrin, which is a well known fumigant, does not kill insects buried in the nuts during a two hour exposure even when it is used at the excessive dose of 48 ounces per 100 cubic feet of space fumigated. When mixed with carbon dioxide at the ratio of 1 part of chloropicrin to 6 parts of carbon dioxide by weight it gives a 100% kill of the insects in two hours with the small dosage of 7 ounces of chloropicrin per 100 cu. ft. of space; when mixed with carbon dioxide at the ratio of 1 to 77 by weight it is even more toxic and will kill the insects under the same conditions at the dosage of 4 ounces of chloropicrin per 100 cu. ft. In an empty tank, or in one filled with merchandise that is not absorptive a mixture of 1 part of chloropicrin to 50 parts of carbon dioxide by weight constitutes the most effective or toxic combination of the two gases for a 30 minute exposure, being 5 times more toxic than chloropicrin alone; the most toxic combination will vary with the length of exposure and the material fumigated. Similarly it requires 11.2 ounces per 100 cu. ft. of ethylene oxide to successfully fumigate a tank full of raw peanuts during a two hour exposure, whereas if it is mixed with carbon dioxide at the ratio of 1 to 10 parts by weight only 4 ounces per 100 cu. ft. of the ethylene oxide are required to successfully fumigate the nut meats in 2 hours. In the fumigation of grain a 1 to 9 mixture of ethylene oxide and carbon dioxide constitutes a very toxic and efficient gas. The same mixture is very effective against all types of insects in enclosed spaces such as rooms, warehouses, etc. The toxicity of carbon disulfide, ethylene dichloride, carbon tetrachloride, methyl chloroacetate and other fumigants is greatly increased by mixing with carbon dioxide at ratios of from 1 to 5 to 1 to 50, depending upon the time of exposure and the materials fumigated. We have also found that in the fumigation of stored grain a mixture of three pounds of ethylene oxide and thirty pounds of solid carbon dioxide per 1000 bushels of grain, applied to the grain as it is being run into the bin, is 100 per cent effective against all grain infesting insects. The solid carbon dioxide greatly increases the toxicity of the ethylene oxide, renders the insects more susceptible to the fumigant and by its low temperature prevents the ethylene oxide from evaporating until it is thoroughly mixed with the grain. Fumigants such as chloropicrin and others with higher freezing points than carbon dioxide can be frozen in blocks with the solid carbon dioxide and the combination used in many types of fumigation.

While we have found in the practice of our invention that the proportions herein given are the most effective, at the same time we do not wish to be restricted by them.

Having thus described our invention, we claim:

1. A solid composition of matter composed of ethylene oxide and solidified carbon dioxide.

2. A solid composition of matter, useful, as a fumigant, composed of carbon dioxide and ethylene oxide, the proportion of ethylene oxide to carbon dioxide being about 1 to 9 by weight.

3. An article of manufacture comprising solid carbon dioxide combined with cold ethylene oxide.

4. An article of manufacture comprising solid carbon dioxide having liquid carbon disulfide entrapped in its pores.

RICHARD T. COTTON.
HARRY D. YOUNG.